No. 750,556. PATENTED JAN. 26, 1904.
A. REIMANN.
SAFETY ARRANGEMENT FOR BICYCLE LANTERNS.
APPLICATION FILED NOV. 11, 1902.
NO MODEL.
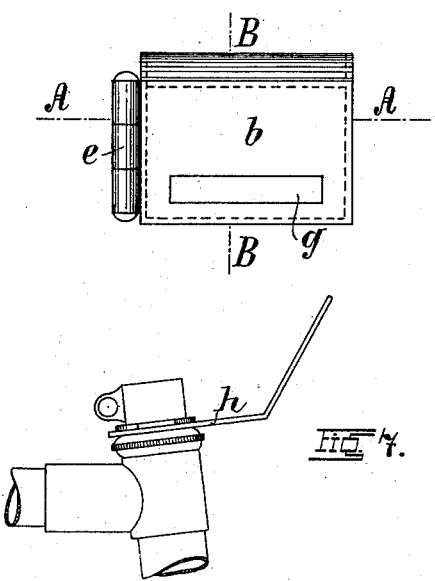
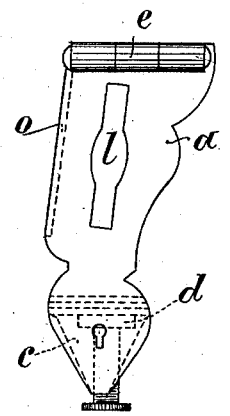
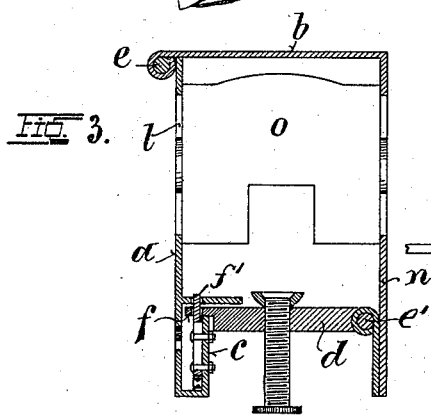
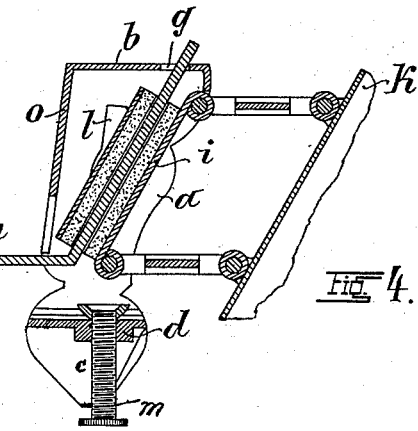
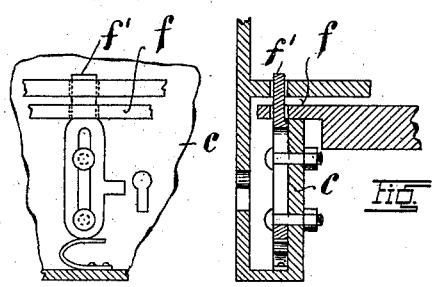
Witnesses:—
C. H. Schilling
Gustav Heyde
Inventor:—
A. Reimann
by Paul E. Schilling
his attorney.

No. 750,556. Patented January 26, 1904.

UNITED STATES PATENT OFFICE.

ALBERT REIMANN, OF WALDENBURG, GERMANY.

SAFETY ARRANGEMENT FOR BICYCLE-LANTERNS.

SPECIFICATION forming part of Letters Patent No. 750,556, dated January 26, 1904.

Application filed November 11, 1902. Serial No. 130,899. (No model.)

*To all whom it may concern:*

Be it known that I, ALBERT REIMANN, a subject of the German Emperor, residing at Waldenburg, in the Province of Silesia, Germany, have invented a new and useful Safety Arrangement for Bicycle-Lanterns, of which the following is a specification.

My invention relates to an improved arrangement to secure bicycle-lanterns which are shoved over a piece of hoop-iron fixed on the wheel-frame (the so-called "lantern-holder") in this position against theft. This safety arrangement essentially differs from those heretofore known in that it requires for its application no special arrangement or expedient either on the wheel or the lanterns and is, moreover, not a fixture on the wheel, but can be removed at any time and attached as desired. It forms an independent arrangement in no way affected by the construction of the bicycle or of the lantern. In the present case the effective securing of the bicycle-lantern by means of a removable arrangement is obtained by covering the turned-up ends of the lantern-holder, on which the lantern-socket is fixed, by a closure in such a way that the socket can only be removed from the lantern-holder after the closure has been previously opened. I attain these objects by mechanism illustrated in the accompanying drawings, in which—

Figure 1 is a top view of the new safety arrangement; Fig. 2, a side view; Fig. 3, a horizontal section on line A A of Fig. 1; Fig. 4, a vertical section on line B B of Fig. 1 with secured lantern. Fig. 5 is an enlarged sectional detail view of the side locking mechanism. Fig. 6 is a section through the same at right angles to that of Fig. 5. Fig. 7 is a view of lantern-holder attached to the bicycle-frame.

Similar letters refer to similar parts throughout the several views.

The arrangement consists of a frame, the two lockable and adjoining sides $a$ and $d$ of which can be folded outward, as they are fixed at the ends of the stiffly-connected sides $b$ and $n$ by joints $e$ and $e'$. The side $a$, being provided with a lock $c$ on its lower end, can be tightly locked to side $d$, the end $f$ of which forms hasp to receive the bolt $f'$ of the lock, Fig. 3. Since the sides $a$ and $d$ are movable, it is possible to place the frame around the upward-turned end of the lantern-holder $h$, Fig. 4, so that the free end of the lantern-holder protrudes through a slot $g$, constructed in the side $b$, and the side $d$, being locked to side $a$, catches under the horizontal part of the lantern-holder fixed on the wheel-frame. Since by this arrangement alone the absolute security of lantern $k$ would not be effected, as the lower ends of the frame could be drawn forward and the frame removed, a back piece $o$ is arranged on the frame, which connected with side $b$ reaches so far down that when the frame is fixed it rests on the horizontal part of the lantern-holder. By such arrangement it is impossible to draw the lower end $d$ of the frame forward.

By the slots $l$, arranged in the sides $a$ and $n$ of the frame, the lantern-socket $i$ can be adjusted sidewise and the safety arrangement secured against rattling by any suitable means, as screw $m$.

Having thus fully described my invention, what I claim as new, and desire to secure by Letters Patent of the United States, is—

The combination with a lantern-holder adapted to be secured to a bicycle-frame and consisting of a horizontal and an upwardly-inclined portion, of a lantern-socket fitting over the inclined portion, and a shell or case fitting over the holder and socket, said shell comprising a rigid top having a slot to fit over the upper forward end of the holder, a rigid side connected with said rigid top, a side hinged to the top opposite to the rigid side, a bottom side hinged to the bottom of the rigid side, and a lock for securing the free edges of the two hinged sides together, substantially as described.

In witness whereof I have hereunto set my hand in the presence of two witnesses.

ALBERT REIMANN.

Witnesses:
PAUL MERZ,
LOUIS KATZ.